This invention relates to an equalizer bar of the type used to support the body and engine structure of tracked vehicles. More particularly, the present invention relates to an improved equalizer bar suspension for supporting the main frame of a tracked type vehicle upon the tractor trucks.

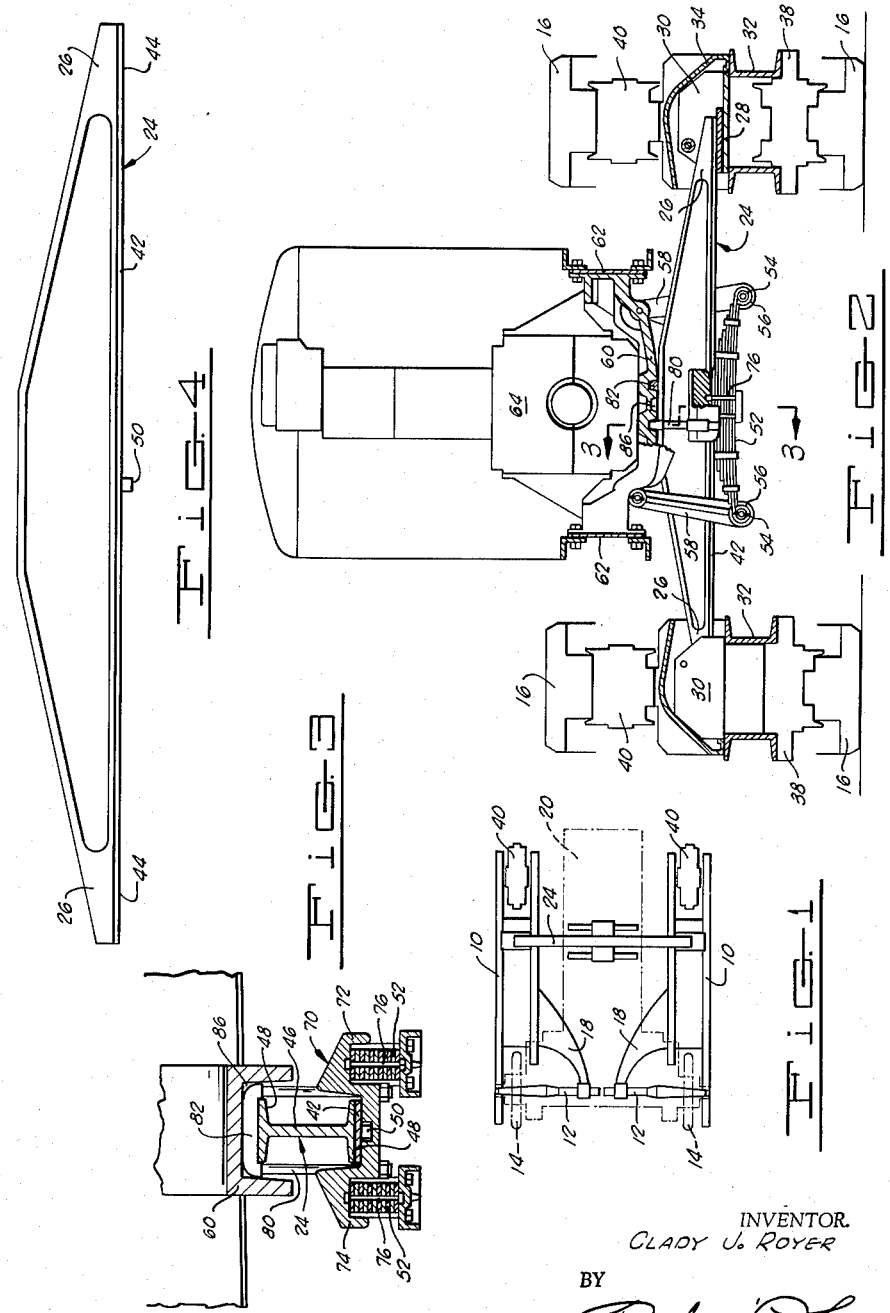
INVENTOR.
CLADY J. ROYER 3,198,275
EQUALIZER BAR FOR USE IN TRACKED
VEHICLES
Clady J. Royer, 2645 NW. 26th St., Oklahoma City, Okla.
Filed May 13, 1964, Ser. No. 367,067
2 Claims. (Cl. 180—9.6)

Crawler tractors of the general type manufactured by the Caterpillar Tractor Company of Peoria, Illinois, and including a main tractor frame or chassis which is adapted to be suspended on a pair of laterally spaced, longitudinally extending trucks are widely used for dirt moving and landscaping operations. In vehicles of this type, a suitable power plant and transmission means are provided on the main frame or chassis and are drivingly connected to sprocket wheels which drive the endless tracks of the vehicle. In vehicles of the type described, the main tractor frame or chassis, including the engine and the major portion of the weight of the entire vehicle, is carried in large part by an equalizer bar which partially supports the frame and distributes the weight of the main frame to each of the laterally spaced trucks which carry the endless tracks of the vehicle.

The equalizer bar has the function of permitting relative oscillatory and pivotal movement in vertical planes of the trucks carrying the endless tracks, or other similarly operable ground engaging mechanisms, but yet maintaining substantially equal weight distribution of the vehicle body and main frame upon the trucks, and also substantially even keel of the main frame during relative movements between the trucks as the vehicle moves over uneven terrain. The main equalizer mechanism permits the tractor body to be pivotally supported in surface contacting engagement therewith and in such manner as to allow the tractor body to roll or rock from point to point. Side-slipping of the tractor body with respect to the main equalizer mechanism is precluded by ridge or flange elements on the equalizer bar which extend into or mesh with cooperating grooves formed in the tractor frame which is held in close engagement with the equalizer bar.

Over the years, a number of innovations, changes and improvements have been made in the types of equalizer bars used to partially support the main tractor frame, and distribute the weight of the main tractor frame to the two laterally spaced trucks. With the mounting of heavy bulldozer blades on the front of tractors of this type, a serious problem has arisen of providing an equalizer bar which can withstand the sudden shifts in the load imposed as a result of raising and lowering the bulldozer blade. Moreover, when the tractor moves over rough terrain, the equalizer bar which extends from one truck to the other beneath the main frame of the tractor is subjected to a twisting torque as a result of the horizontal misalignment and twisting movements of the two trucks which move independently of each other. The result of this twisting movement is that the metal of the equalizer bar is frequently fatigued and is fractured within relatively short periods of usage.

The types of equalizer bars which have been more recently provided have been of leaf spring construction or of a fabricated box-type construction which, though providing satisfactory fredom of movement in a vertical plane as the main frame and engine of the tractor may move upwardly and downwardly relative to the laterally spaced trucks of the tractor, does not have sufficient resilient response to pivotation about the longitudinal axis of the tractor to prevent metal fatigue and destruction of the equalizer bar within a relatively short time when operating over a rough terrain, or when repeatedly using the heavy bulldozer blade attached to the front end of the tractor.

It has further been proposed in recent equalizer bar improvements to connect the opposite ends of the equalizer bar to the truck structures through ball and socket joints or other pivotal connections so that pivotal movements of the trucks about a horizontal axis do not result in a twisting movement being imposed upon the respective ends of the equalizer bar with the result that these ends are broken off after relatively short service life. A problem which has occurred concurrently with the provision of pivotal connections between the ends of the equalizer bar to the trucks, however, is that the trucks cannot move laterally away from each other to any extent, but are maintained in the same spatial arrangement to each other despite incongruities in the terrain over which the tractor is moving which tend to pivot the trucks about a vertical axis and move portions thereof farther apart during operation of the tractor.

An alternative equalizer bar construction to that in which the opposed ends of the equalizer bar are connected through pivotal connections to the trucks of the tractor is that in which the opposite ends of the bar are merely permitted to slide on suitable plates provided on the trucks so that the trucks can actually move toward or away from each other during operation of the tractor. This construction offers some advantage in that the trucks can move more independently of each other and with respect to the main frame of the tractor than can be realized where positive securement of the ends of the equalizer bar to the respective trucks is provided. On the other hand, due to the lateral movement of the ends of the equalizer bar on the trucks, considerable frictional wear is engendered at these points with the result that the ends of the equalizer bar frequently become weakened to the point of fracturing or breaking off early in the life of the equalizer bar. In such cases, the equalizer bar must be replaced, or the fractured end must be repaired. The latter operation is quite expensive in the case of the built-up leaf spring equalizer bar construction.

The present invention provides an improved equalizer bar suspension for supporting the main frame and engine of a tracked vehicle and distributing the weight evenly to the laterally spaced trucks of the vehicle. The equalizer bar construction and its manner of mounting upon the trucks is such that the bar can accommodate itself to changes in the relative position of the two trucks and the main frame of the tractor without sustaining excessive metal fatigue as a result of the imposed compressive, torsional and tension stress loads which are encountered when operating on various types of terrain. Frictional wear imposed upon opposite ends of the equalizer bar is also provided for by the inclusion in the bar construction of a wear plate along the lower surface thereof which absorbs all of the frictional wear engendered by lateral shifting of the trucks relative to the equalizer bar and to the main frame of the tractor.

More specifically, the equalizer bar of the present invention comprises a cast steel I beam which is tapered at its opposite ends to a relatively narrow thickness and which supports at its central portion, the greater portion of the weight of the main frame and the engine of the tractor. The opposite ends of the I beam equalizer bar rest upon wear plates of the two track-carrying trucks of the vehicle, and are permitted freedom of lateral movement thereon by virtue of the absence of any rigid connection between these members. A relatively thin wear plate is secured to the bottom surface of the equalizer bar and functions to absorb the frictional wear imparted to the bar by relative movement between the trucks of the vehicle and the main frame. The end portions of the wear plate secured to the bottom surface of the equalizer bar are heat treated so as to afford greater resistance to frictional wear at these points. When the frictional wear imparted to the ends of the wear plate becomes so severe as to destroy a substantial portion of the ends of the wear plate, the wear plate can be easily removed from the main portion of the equalizer bar, and a new wear plate tack-welded in place with relatively little difficulty or expense.

I have found that the I beam construction of the equalizer bar permits it to sustain torsional loading of relatively high magnitude without metal fatigue or fracturing, and permits it to sustain repeated lifting and lowering of the heavy bulldozer blade mounted at the front end of the tractor without structural failure. The bar therefore constitutes a substantial improvement over the leaf spring type equalizer bars heretofore in use. Moreover, the absence of any rigid connection of the ends of the equalizer bar to the trucks permits greater freedom of movement in a lateral direction between the equalizer bar and the trucks, and thus places less mechanical stress on the equalizer bar as the trucks are canted from a vertical plane in moving over uneven ground.

From the foregoing description of the invention, it will have become apparent that it is an object of the present invention to provide an improved equalizer bar for use on tracked vehicles which is relatively inexpensive as compared to previous leaf spring type equalizer bars or fabricated box-type equalizer bars, and yet is characterized by a longer, more trouble-free service life.

Another object of the invention is to provide an equalizer bar for supporting the main frame of a tracked vehicle on a pair of endless track mechanisms, which bar can be easily installed on existing tractors in place of bars of the type previously used.

Another object of the invention is to provide a tracked vehicle equalizer bar which is a one-piece casting capable of withstanding torsional loads of greater magnitude than leaf spring type equalizer bars of the type most recently used.

A further object of the invention is to provide an equalizer bar which has a specially constructed wear surface which can be easily replaced without expensive rebuilding or replacement of the entire equalizer bar.

A further object of the present invention is to provide an equalizer bar of the type used to support the main frame and engine of a track vehicle, which bar is not rigidly connected at its ends to the laterally spaced trucks of the tracked vehicle, and which therefore permits greater play or relative movement to occur between the trucks and the main frame of the vehicle.

In addition to the foregoing described objects and advantages, other objects and advantages will be perceived to characterize the present invention as the following detailed description of the invention is read in conjunction with the accompanying drawings which illustrate the invention.

In the drawings:

FIGURE 1 is a schematic view of a tracked vehicle having equalizer bar apparatus for supporting the front end of the tractor body or main frame upon the endless track or truck mechanism.

FIGURE 2 is a vertical transverse sectional view illustrating the equalizer bar of the present invention as it appears when installed upon a tracked vehicle in operating position.

FIGURE 3 is a cross-sectional view taken along line 3—3 of FIGURE 2.

FIGURE 4 is an enlarged view of the equalizer bar of the present invention.

Referring initially to FIGURE 1 of the drawings, the tractor vehicle upon which is located the equalizer bar of the present invention includes track frames 10 pivotally or hingedly secured at the rear of the tractor body to oscillate in vertical planes about the axis of rear axles 12. Drive sprockets 14 are provided for engaging the customary endless tracks 16 (illustrated in FIGURE 2) to thereby effect propulsion of the tractor. The pivotal connections of the track frames or trucks 10 permit vertical oscillatory movements of the track mechanisms independently of each other to allow the tractor to accommodate itself to rough ground and obstacles over which it may be traveling. The trucks 10 are maintained in parallel relationship with respect to each other, and are prevented from spreading by means of braces 18 which pivotally connect the trucks to the tractor main frame or body 20. The tractor main frame or body 20 is supported adjacent its front portion on the equalizer bar 24 which spans the trucks 18 and is slidably supported thereon.

As shown in FIGURES 2, 3 and 4, the equalizer bar suspension system comprises an equalizer bar 24 constructed in accordance with the present invention and having its free ends 26 resting upon wear plates 28 which are each carried in a U-shaped guide 30 positioned within a yoke 34 which is slidably mounted on the roller frame 32. The weight of the tractor is transmitted to the ground engaging stretches of tracks 16 by rollers 38 mounted on the frames 32. The upper stretches of the tracks 16 are supported by rollers 40 carried by the frames 32.

From the description thus far, it will be perceived that the equalizer bar 24 is permitted to move freely in a lateral direction relative to the trucks 10 positioned at each side of the tractor. The wear imparted to the equalizer bar 24 by frictional contact with the plates 28 carried by the trucks is received by a wear plate 42 which is tack-welded to the bottom surface of the equalizer bar, and extends over the length thereof as shown in FIGURE 4. The opposite end portions 44 of the wear plate 42 are heat treated to harden this portion of the wear plate and impart to the wear plate greater resistance to abrasion and frictional wear.

The cross-sectional configuration of the equalizer bar 24 may best be perceived by referring to FIGURE 3. As will be perceived in referring to this drawing, the equalizer bar is generally I-shaped in cross-section, having a web portion 46 and a pair of flange portions 48. The flanges 48 of the equalizer bar taper from its widest central portion to near convergence at the ends 26 of the bar where the bar becomes a solid structure by merger of the two flanges. The wear plate 42 is welded to the lower flange portion 48 after it has been machined away to provide a bright, even surface to accommodate the abutting surface of the wear plate. A keying projection 50 is secured to the wear plate 42 intermediate the length of the equalizer bar 24 and functions in a manner hereinafter described for retaining the relative position between the main frame of the tractor and the equalizer bar.

The manner in which the equalizer bar is used conjunctively with auxiliary springs for supporting the main frame of the tracked vehicle is best illustrated in FIGURES 2 and 3. The auxiliary springs which cooperate with the equalizer bar in supporting the load of the main frame are designated by reference character 52. The auxiliary springs 52 may be conventional leaf springs of the type now used in equalizer bar suspension systems. The ends of the auxiliary springs 52 are pivotally mounted on pins 54 which are pivoted in bosses 56 of links 58. The links 58 extend upwardly from the auxiliary springs 52 on opposite sides of the equalizer bar 24, and are pivotally connected at their upper ends to the frame cross member 60. The frame cross member 60 is in turn bolted to the side members 62 of the main frame or body of the tractor vehicle. The engine of the vehicle is designated by reference character 64.

The equalizer bar 24 passes through a bracket 70 which has similar opposite portions 72 and 74 resting upon the auxiliary springs 52. The bracket 70 is retained in position on the auxiliary springs 52 by the engagement of slots or apertures in the bracket 70 with headed bolts 76 which pass through, and retain the alignment of, the leafs of the auxiliary springs. The bracket 70 receives the ends of U-bolts 80 which are passed over the top of the equalizer bar 24 with the legs thereof passing through apertures formed in the bracket 70. The web or bight portions 82 of the U-bolts which pass across the top of the equalizer bar 24 are received in recesses 86 formed in the bottom wall of the frame cross member 60. The arcuate shape of the frame cross member 60 permits the body of the tracked vehicle to rock or pivot on the equalizer bar 24 while the engagement of the cross member 60 and the web portions 82 of the U-bolts 80 prevents relative lateral or endwise movement between the frame and the equalizer bar.

The U-bolts 80 are spaced laterally from each other along the equalizer bar 24 as shown in FIGURE 2, with the distance of spacing of the outermost U-bolts usually being at least 10 inches. The U-bolts with the bracket 70 perform a damping function, tending to damp out torsional forces applied to opposite ends of the equalizer bar 24 and preventing this bar from being fractured in the center. This factor, conjunctively with the greater ability of the I beam to withstand torsional loading, imparts to the equalizer bar of this invention a considerably longer service life than has been characteristic of either the leaf spring-type equalizer bars or of the box-type equalizer bars which are generally rectangular in cross-section.

The method of mounting the novel equalizer bar of the present invention on a tracked vehicle, though having been described in some detail herein, is substantially identical to that which has previously been used in the mounting of leaf spring type equalizer bars of the type shown in Eberhard United States Patent 2,022,080. Such mounting arrangement, and the structure which is used in conjunction with the equalizer bar of this invention in such mounting arrangement, constitute no part of the present invention, except insofar as the combination of the present equalizer bar with such structure constitutes a novel combination.

From the foregoing description of the invention, it is believed that it will be perceived that the present invention provides a novel equalizer bar for use on tracked vehicles, which bar may be economically constructed and yet which is able, by virtue of its cross-sectional configuration and overall construction, to withstand torsional, compressional and tensional forces of large magnitude for longer periods of time than has been characteristic of equalizer bars of the type heretofore in use.

Although a preferred embodiment of the invention has been herein disclosed, it is to be understood that certain minor modifications and changes may be made in the described structure without departure from the basic concepts and principles upon which the invention is founded. Insofar, therefore, as these changes and modifications do not involve a departure from, or relinquishment of, the basic principles of the invention, such modifications are deemed to be circumscribed by the spirit and scope of the invention except as the same may be limited by the appended claims or reasonable equivalents thereof.

What is claimed is:

1. In a tracked vehicle of the type having a pair of horizontally spaced trucks carrying endless tracks, a main frame connected to said trucks adjacent the rear end of the said trucks, an engine carried on said main frame, a pair of spaced auxiliary springs connected to said main frame and disposed forwardly of the points of connection of said main frame to said trucks, a bracket spaced below said main frame and passing between and secured to said auxiliary springs, and at least two horizontally spaced U-bolts connected to said bracket for securing an equalizer bar thereto, the improvement which comprises:

a unitary elongated equalizer bar having its opposite ends supported freely by said trucks for sliding movement on said trucks in a transverse direction and passing beneath and supporting at its center said main frame and engine, said equalizer bar comprising:

a unitary elongated beam having a central web portion and a pair of flanges secured to the longitudinal edges of said web portion to form an I-shaped cross-section for said beam, said web portion being tapered and diminishing in width toward each of its ends and one of said flanges converging toward and intersecting the other of said flanges at each end of said beam, said beam passing through said U-bolts and over said bracket; and a wear plate secured to the other of said flanges and extending the length of said beam to form a surface for contacting said trucks.

2. A tracked vehicle comprising, in combination, (a) a pair of horizontally spaced trucks carrying endless tracks;

(b) a main frame connected to said trucks adjacent the rear end of said trucks;

(c) an engine carried on said main frame;

(d) an elongated equalizer bar extending across the tracked vehicle beneath said main frame and having its opposite ends freely supported by said trucks for sliding movement on said trucks in a transverse direction, said bar passing beneath, and supporting at its center, said main frame and engine, said equalizer bar comprising:

a unitary elongated beam having a central web portion and a pair of flanges secured to the longitudinal edges of said web portion to form an I-shaped cross-section for said beam, said web portion being tapered and diminishing in width toward each of the ends, and one of said flanges converging toward and intersecting the other of said flanges at each end of said beam; and a wear plate secured to the other of said flanges and extending the length of said beam to form a surface for contacting said trucks;

(e) a pair of auxiliary springs disposed on opposite sides of said equalizer bar adjacent the center thereof and between said trucks, said springs each being connected to said main frame;

(f) a bracket passing beneath said equalizer bar in contact therewith and connected to said auxiliary springs; and (g) a pair of horizontally spaced U-bolts each having its free end passing through apertures in said bracket and having its web portion passing across one flange of said equalizer bar and positioned in an aperture in said main frame whereby said U-bolts and brackets retain the central portion of said equalizer bar in rigid longitudinal alignment and damp out torsional forces applied to opposite ends of said equalizer bar tending to twist said equalizer bar about its longitudinal axis.

References Cited by the Examiner

UNITED STATES PATENTS

| | | | |
|---|---|---|---|
| 1,715,055 | 5/29 | Best | 180—9.6 |
| 1,806,819 | 5/31 | Paulson | 180—9.54 |
| 2,022,080 | 11/35 | Eberhard | 180—9.6 |
| 2,034,135 | 3/36 | Eberhard | 180—9.6 |
| 2,076,009 | 4/37 | Starr | 180—9.6 |
| 2,233,627 | 3/41 | McDonald | 180—9.6 |
| 2,474,514 | 6/49 | Burks | 180—9.6 |
| 2,863,516 | 12/58 | Peterson | 180—9.5 |
| 2,936,841 | 5/60 | Mazzarins | 180—9.54 |
| 2,988,159 | 6/61 | Weber | 180—9.5 |

BENJAMIN HERSH, *Primary Examiner.*

ARTHUR L. LA POINT, *Examiner.*